United States Patent [19]
Lum et al.

[11] Patent Number: 5,440,262
[45] Date of Patent: Aug. 8, 1995

[54] HIGH-EFFICIENCY RING/MWL GENERATOR

[75] Inventors: Jack G. S. Lum, Sunnyvale; Peter Pong, San Jose, both of Calif.

[73] Assignee: Rolm Company, Santa Clara, Calif.

[21] Appl. No.: 111,098

[22] Filed: Aug. 24, 1993

[51] Int. Cl.$^6$ .............................................. G05F 1/10
[52] U.S. Cl. ................................. 327/544; 379/373; 379/376
[58] Field of Search .......................... 379/373, 376; 307/296.3

[56] References Cited

U.S. PATENT DOCUMENTS 5,230,018  7/1993  Gericke ................................. 379/376

*Primary Examiner*—Margaret Rose Wambach
*Attorney, Agent, or Firm*—Michael B. Einschlag

[57] ABSTRACT

An embodiment of the present invention is a power generator which provides a power waveform for applying power to ringing circuits and message-waiting lamps (Ring/MWL) in standard analog telephones in a PBX and which power generator reduces power dissipation. In particular, an embodiment of the inventive power generator includes: (a) a controller which generates a low-level signal representing the power waveform and a timing and control signal indicative of various portions of the low-level analog signal; (b) a circuit, responsive to the timing and control signal, which alters the output of a power supply; and (c) a power amplifier, responsive to the low-level signal and the output of the power supply, which amplifies the low-level signal to produce the power waveform.

10 Claims, 2 Drawing Sheets

HIGH-EFFICIENCY RING/MWL GENERATOR

TECHNICAL FIELD OF THE INVENTION

The present invention relates to a combination ringing and message-waiting lamp (Ring/MWL) power generator for use, in particular, in a private branch exchange (PBX) switching machine.

BACKGROUND OF THE INVENTION

As is known in the art, in applications such as in a private branch exchange (PBX) switching machine, there is a need to supply power to ringing circuits in analog telephones connected to the switch and there is a need to supply power to message-waiting lamps connected to the analog telephones which are, in turn, connected to the switch. The voltage required for the ringing circuit is, for example, an 85 V rms sine wave having an amplitude between 0 V and 120 V and the voltage required for illuminating a neon message waiting light is, for example, about −150 V dc. In practice, the maximum power delivered to these circuits is quite high, being approximately 18 Watts during a ringing interval and being approximately 50 Watts during a message-waiting lamp interval. Unless the power efficiency of the power generators are high, power generators of this type can dissipate a large amount of heat and power. Further, such a large heat and power dissipation may decrease the reliability of the power generators which are typically shared critical resources in the PBX.

In light of the above, there is a need in the art for a power generator for use in providing power to ringing circuits and message-waiting lamps (Ring/MWL) which reduces power dissipation.

SUMMARY OF THE INVENTION

Advantageously, embodiments of the present invention are Ring/MWL power generators which provide a power waveform for applying power to ringing circuits and message-waiting lamps and which power generator reduces power dissipation. In particular, an embodiment of the inventive power generator comprises: (a) means for generating a low-level signal representing the power waveform and for generating a timing and control signal indicative of various portions of the low-level analog signal; (b) means, responsive to the timing and control signal, for altering the output of a high-voltage power supply; and (c) means, responsive to the low-level signal and the output of the high-voltage power supply, for amplifying the low-level signal to produce the power waveform.

Advantageously, embodiments of the present invention reduce power dissipation in a power amplifier and, thereby, increase the circuit's reliability. Further, embodiments of the present invention reduce power dissipation in the high-voltage power supply and, thereby, increase the supply's reliability. Still further, embodiments of the present invention eliminate a need for large and expensive heatsinks to cool power transistors and decrease the cost of the Ring/MWL power generator. Yet still further, when used in conjunction with a PBX, embodiments of the present invention reduce power loading on a PBX system power supply as compared with conventional designs and help alleviate temperature rise inside the PBX cabinet.

DETAILED DESCRIPTION

Figure 1:
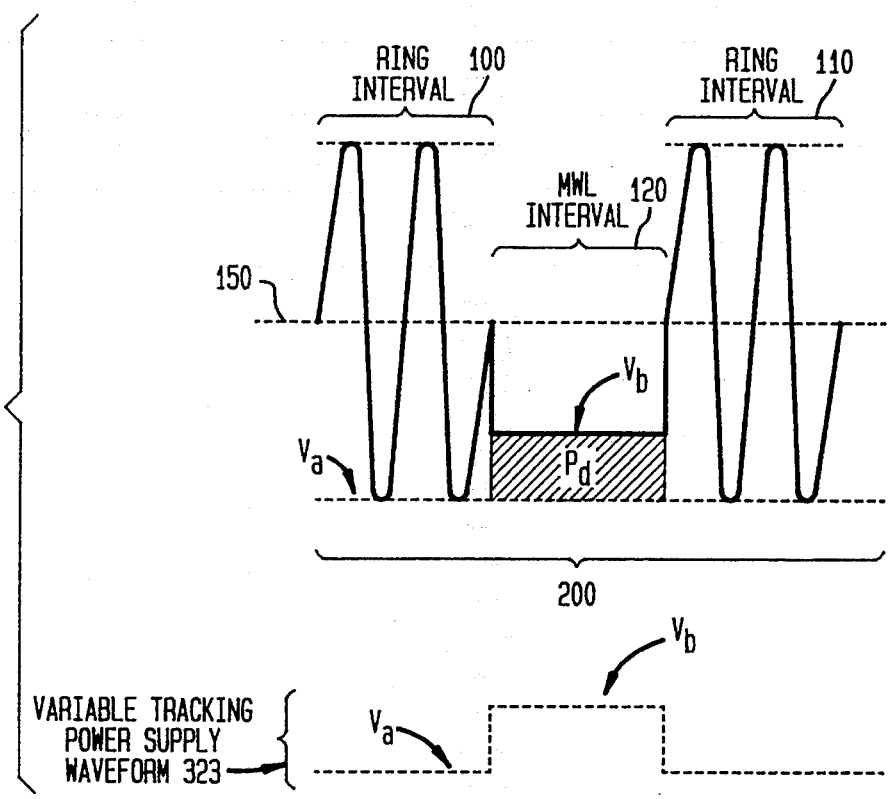
FIG. 1 shows a high-power, Ring/MWL composite, output signal waveform produced by embodiments of the present invention.

FIG. 1 shows a high-power, Ring/MWL composite, output signal waveform produced by embodiments of the present invention. As shown in FIG. 1, ring and message-waiting lamp (Ring/MWL) composite signal 200 is shown having sinusoidal ring intervals 100 and 110 and dc MWL interval 120. Further, as shown in FIG. 1, $V_a$ is the voltage produced by a dc power supply during ring intervals 100 and 110. $V_b$ is the power supply voltage used in illuminating a typical neon message waiting light for an analog telephone, voltage 150 is −48 V dc with respect to ground, and signals 100 and 110 are 85 V rms sinusoidal waveforms being 0 V to ±120 V peak. As one can readily appreciate from FIG. 1, $P_d$ is the power saved during MWL interval 120 by embodiments of the present invention by reducing the voltage from $V_a$ to $V_b$. Although FIG. 1 shows a composite signal wherein a ring interval is followed by a message-waiting lamp interval which is followed, in turn, by another ring interval, those of ordinary skill in the art understand that this signal is merely illustrative of signals which are produced by embodiments of the invention and that other signals may be produced such as, for example, sequences of a ring interval and a no-ring interval, sequences of a message-waiting lamp interval and a no-message-waiting lamp interval, and so forth.

Figure 2:
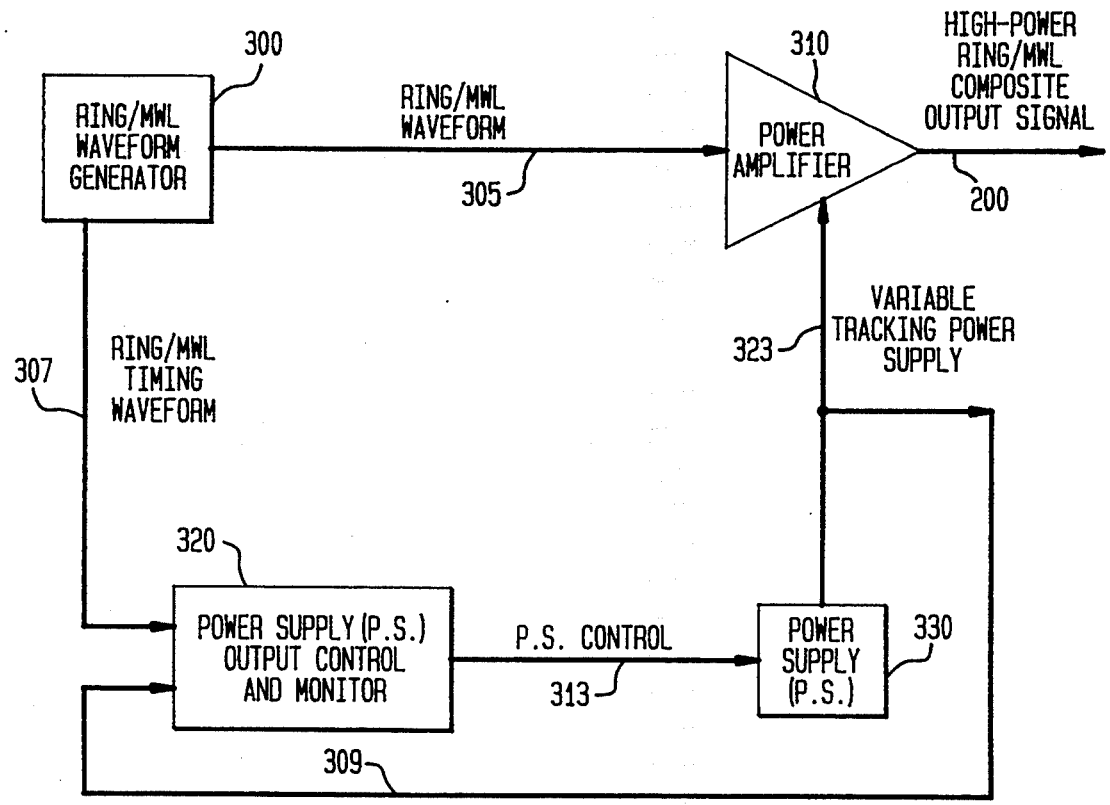
FIG. 2 shows a block diagram of an embodiment of the present invention.

FIG. 2 shows a block diagram of an embodiment of the present invention. As shown in FIG. 2, Ring/MWL waveform generator 300 generates two wave forms, Ring/MWL waveform 305 which is applied as an input to power amplifier 310 and Ring/MWL timing waveform 307 which is applied as an input to power supply output control and monitor circuit 320. As is known in the art, Ring/MWL waveform 305 is a small signal version of a composite Ring/MWL output waveform. Ring/MWL timing waveform 307 is a control signal which indicates the interval, whether ringing or MWL, that is represented in small signal Ring/MWL waveform 305. Power supply output control and monitor circuit 320, in response to Ring/MWL timing waveform 307 and feedback signal 309, produces power supply control signal 3 13. Power supply control signal 3 13 is applied as input to power supply 330. In response to power supply control signal 3 13, power supply produces variable tracking power supply voltages 323 which is applied as input to power amplifier 310.

In one embodiment of the present invention, power output control and monitor 320 is a differential amplifier and ring/MWL timing waveform 307 is a reference voltage which is compared with feedback signal 309. Output error signal 3 13 from power output and control monitor 320 is used in a manner which is well known in the art to regulate the output of power supply 330.

FIG. 1 shows variable tracking power supply 323. As one can appreciate from FIG. 1, variable tracking power supply waveform 323 has a larger amplitude during ringing intervals 100 and 110 than it has during MWL interval 120. This reduces the power dissipation during MWL interval 120 described above.

Lastly, as can be readily understood by those of ordinary skill in the art, with reference to FIG. 2, in response to variable tracking power supply waveform 323 and Ring/MWL waveform 305, power amplifier 310 produces Ring/MWL composite signal 200 which is used, for example, to drive analog telephones connected to a PBX. Thus, in accordance with the present invention, variable tracking power supply waveform 323, in sync with Ring and MWL time intervals, removes unnecessary voltage "headroom" that would otherwise be dissipated as wasted power and heat in power amplifier 310 (referring to $P_d$ shown in FIG. 1).

Thus, in summary, an embodiment of the inventive Ring/MWL generator produces a timing signal to vary and synchronously control the output voltage of a power supply which drives a power amplifier. During a ring interval, the power supply produces its highest output-voltage (see voltage $V_a$ of FIG. 1) to generate a high voltage Ring output signal. However, during an MWL interval, the power supply produces a lower voltage (voltage $V_b$ of FIG. 1) to generate a lower voltage MWL signal. Embodiments of the present invention reduce power dissipation in the power amplifier substantially. For example, in a conventional design utilizing a fixed voltage power supply, a surplus "headroom" of 30 volts (the difference between $V_a$ and $V_b$ in FIG. 1) is usually placed on the power amplifier during an MWL interval. Such a surplus results in 15 Watts of power dissipation in the power amplifier for a 0.5 Amp load current. Utilizing an embodiment of the present invention which provides a variable tracking power supply which can drop the "headroom" voltage to 1 Volt or less, power dissipation is reduced to less than 0.5 Watts, a 30:1 reduction in power dissipation.

Figure 3:
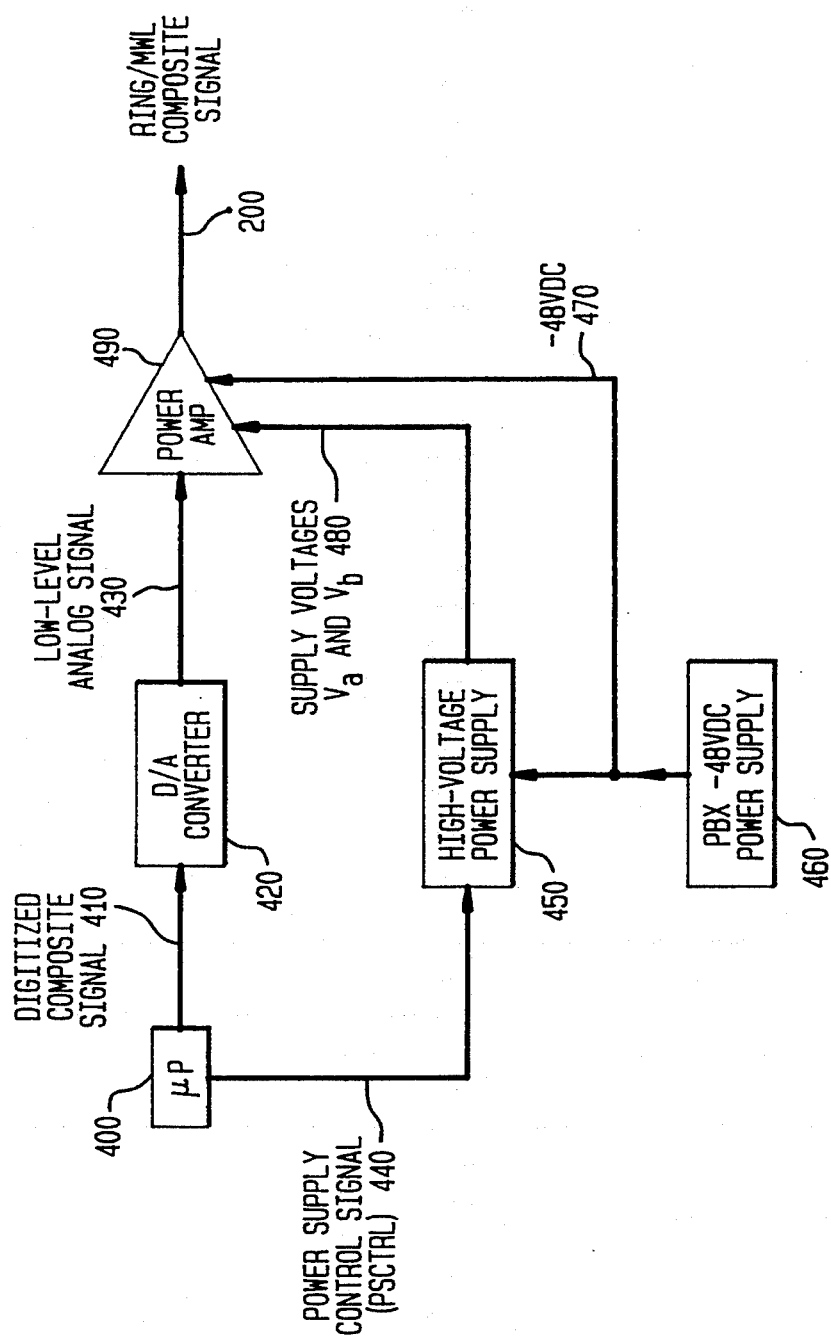
FIG. 3 shows a block diagram of a preferred embodiment of the present invention.

FIG. 3 shows a block diagram of a preferred embodiment of the present invention. As shown in FIG. 3, µP 400 produces two signals, digitized composite signal 410 and power supply control signal 440 (PSCTRL 440), to regulate the operation of the preferred embodiment. Digitized composite signal 410 is a digitized representation of a power waveform such as, for example, the composite ringing and message waiting signal shown in FIG. 1. Digitized composite signal 410 is produced by a firmware algorithm that resides in a read-only memory (ROM) of µP 400. The algorithm utilizes a look-up table of values to generate 6-bit words where each 6-bit word corresponds to a specific analog voltage level once the digital word is converted into an analog signal. In accordance with the preferred embodiment, the conversion is performed via 6-bit digital-to-analog (D/A) converter 420. In accordance with the algorithm, each word in the look-up table is scanned to produce a digital sequence that will generate low-level analog signal 430 from D/A converter 420 which comprises a 4 V rms sine wave and a −4.8 V dc signal (low-level analog signal 430 of FIG. 3 corresponds to Ring/MWL waveform 305 of FIG. 2). Low-level analog signal 430 output by D/A converter 420 does not have enough voltage or current to directly drive a ringer and a message-waiting lamp of a telephone. Therefore, Class "B" power amplifier 490 is utilized to boost low-level analog signal 430 to the power levels needed to drive the loads. In particular, amplified Ring/MWL composite signal 200 comprises an 85 V rms, 20 Hz sine wave for ringing the telephones and a −100 V dc level for driving neon message-waiting lamps. In one particular embodiment of the preferred embodiment, Class "B" power amplifier 490 is an electrically floating source which receives a −48 V dc bias from a −48 V dc power supply associated with a PBX. In this case, composite Ring/MWL composite signal 200 is comprised of an 85 V rms sine wave (biased by −48 V dc) and a −148 V dc level. Embodiments of µP 400, D/A converter 420, and power amplifier 490 are well known to those of ordinary skill in the art.

As further shown in FIG. 3, µP 400 produces power supply control signal 440 which is applied as input to high-voltage power supply 450. High-voltage power supply 450 provides voltage and current to energize power amplifier 490 and the load. High-voltage power supply 450 produces two output levels, depending on whether power amplifier 490 is ringing telephones or illuminating message-waiting lamps. Power amplifier 490 requires a higher voltage (±125 V de) to ring the telephones than it does to illuminate the lamps (±105 V dc). In one particular embodiment of the preferred embodiment, a negative flyback DC-to-DC converter is used to generate these voltages from PBX −48 dc power supply 460.

PSCTRL signal 440 produced by µP 400 is a two-state digital signal which controls the output voltage from high-voltage power supply 450. PSCTRL 440 is generated by a firmware algorithm in µP 400 and it is synchronized with digitized composite signal 410 applied as input to D/A converter 420. At the beginning of a ringing interval, µP 400 sets the state of PSCTRL 440 to a level that will cause high-voltage power supply 450 to produce ±125 V dc. At the beginning of a message-waiting interval, µP 400 changes the state of PSCTRL 440 to a level that will cause high-voltage power supply 450 to produce ±105 V dc. High voltage power supply 450 of FIG. 3 is a variable power supply and includes power output control and monitor 320 and power supply 330 shown in FIG. 2. This cycle of events will repeat at the start of the next ringing interval. As a result, and in accordance with the present invention, PSCTRL 440 enables high-voltage power supply 450 to deliver the minimum "headroom" voltage needed by power amplifier 490 to drive each load.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention. In particular, although the above-described embodiment utilized a microprocessor-based controller and waveform generator, embodiments of the present invention can also be embodied utilizing analog circuits exclusively. For example, the microprocessor-based waveform generator can be replaced with well known analog sine wave and voltage ramp generator circuits. The outputs from these circuits can be combined, via an analog summing circuit, to produce the low-level composite waveform that is applied to the power amplifier. Further, the PSCTRL signal can be derived from the output of the voltage ramp generator. Thus, in light of this, it is to be understood that the claims appended hereto are intended to cover all such modification and variations which fall within the true scope and spirit of the invention.

What is claimed is:

1. A power wave form generator for producing a power waveform which comprises:
   means for generating a low-level analog signal representing the power waveform;
   means for generating a timing and control signal indicative of various portions of the low-level analog signal;
   means, responsive to the timing and control signal, for altering the output of a power supply; and
   means, responsive to the low-level analog signal and the output of the power supply, for amplifying the low-level analog signal to produce the power waveform.

2. The power generator of claim 1 wherein the means for generating a low-level signal comprises a microprocessor controller.

3. The power generator of claim 2 wherein the means for generating a low-level signal further comprises a D/A converter.

4. The power generator of claim 1 wherein the means for generating a timing and control signal comprises a microprocessor controller.

5. The power generator of claim 1 wherein the means for amplifying the low-level signal comprises a power amplifier.

6. A power waveform generator for producing a power waveform which comprises:
   means for generating a low-level signal representing the power waveform and for generating a timing and control signal indicative of various portions of the low-level analog signal;
   means, responsive to the timing and control signal, for altering the output of a power supply; and
   means, responsive to the low-level signal and the output of the power supply, for amplifying the low-level signal to produce the power waveform.

7. The power generator of claim 6 wherein the means for generating a low-level signal comprises a microprocessor controller.

8. The power generator of claim 7 wherein the means for generating a low-level signal further comprises a D/A converter.

9. The power generator of claim 6 wherein the means for generating a timing and control signal comprises a microprocessor controller.

10. The power generator of claim 6 wherein the means for amplifying the low-level signal comprises a power amplifier.

* * * * *